US011914078B2

(12) United States Patent
Silver et al.

(10) Patent No.: US 11,914,078 B2
(45) Date of Patent: Feb. 27, 2024

(54) CALIBRATION OF A DEPTH SENSING ARRAY USING COLOR IMAGE DATA

(71) Applicant: APPLE INC., Cupertino, CA (US)

(72) Inventors: David Silver, Haifa (IL); Moshe Laifenfeld, Haifa (IL); Tal Kaitz, Kiryat Ono (IL)

(73) Assignee: APPLE INC., Cupertino, CA (US)

( * ) Notice: Subject to any disclaimer, the term of this patent is extended or adjusted under 35 U.S.C. 154(b) by 355 days.

(21) Appl. No.: 17/268,963

(22) PCT Filed: Sep. 2, 2019

(86) PCT No.: PCT/US2019/049252
§ 371 (c)(1),
(2) Date: Feb. 17, 2021

(87) PCT Pub. No.: WO2020/055619
PCT Pub. Date: Mar. 19, 2020

(65) Prior Publication Data

US 2021/0208262 A1 Jul. 8, 2021

Related U.S. Application Data

(60) Provisional application No. 62/731,914, filed on Sep. 16, 2018.

(51) Int. Cl.
*G01S 7/497* (2006.01)
*G01S 17/86* (2020.01)
*G01S 17/89* (2020.01)

(52) U.S. Cl.
CPC .............. *G01S 7/497* (2013.01); *G01S 17/86* (2020.01); *G01S 17/89* (2013.01)

(58) Field of Classification Search
CPC ........... G01S 7/497; G01S 17/86; G01S 17/89
See application file for complete search history.

(56) References Cited

U.S. PATENT DOCUMENTS 8,456,517 B2 6/2013 Spektor et al.
8,786,678 B2 7/2014 Schmidt et al.
(Continued)

FOREIGN PATENT DOCUMENTS

CN 106772430 A 5/2017
WO 2009059391 A1 5/2009
WO 2020068377 A1 4/2020

OTHER PUBLICATIONS

International Application # PCT/US2019/049252 Search Report dated Nov. 25, 2019.
(Continued)

*Primary Examiner* — Tarifur R Chowdhury
*Assistant Examiner* — Carlos Perez-Guzman
(74) *Attorney, Agent, or Firm* — Kligler & Associates Patent Attorneys Ltd.

(57) ABSTRACT

Imaging apparatus (22) includes a radiation source (40), which emits pulsed beams (42) of optical radiation toward a target scene (24). An array (52) of sensing elements (78) output signals indicative of respective times of incidence of photons in a first image of the target scene that is formed on the array of sensing elements. An image sensor (64) captures a second image of the target scene in registration with the first image. Processing and control circuitry (56, 58) identifies, responsively to the signals, areas of the array on which the pulses of optical radiation reflected from corresponding regions of the target scene are incident, and processes the signals from the sensing elements in the identified areas in order measure depth coordinates of the corresponding regions of the target scene based on the times of incidence, while identifying, responsively to the second image, one or more of the regions of the target scene as no-depth regions.

19 Claims, 5 Drawing Sheets

(56) References Cited

U.S. PATENT DOCUMENTS

| | | | |
|---|---|---|---|
| 9,582,889 | B2 | 2/2017 | Shpunt et al. |
| 9,997,551 | B2 | 6/2018 | Mandai et al. |
| 10,324,171 | B2 | 6/2019 | Niclass et al. |
| 10,605,916 | B2 | 3/2020 | Molnar et al. |
| 10,620,300 | B2 | 4/2020 | Sharma et al. |
| 2014/0064555 | A1 | 3/2014 | Sebastian et al. |
| 2016/0249039 | A1* | 8/2016 | Tran .................... H04N 13/139 |
| 2017/0272651 | A1 | 9/2017 | Mathy et al. |
| 2018/0096489 | A1* | 4/2018 | Cohen .................. G01S 17/894 |
| 2018/0232947 | A1 | 8/2018 | Nehmadi et al. |
| 2018/0249143 | A1 | 8/2018 | Calpe Maravilla et al. |

OTHER PUBLICATIONS

International Application # PCT/US2019/049253 Search Report dated Mar. 13, 2020.

EP Application # 19769672.7 Office Action dated Jun. 7, 2023.

CN Application 201980060149X Office Action dated Nov. 21, 2023.

CN Application 201980062540.3 Office Action dated Dec. 8, 2023.

* cited by examiner

CALIBRATION OF A DEPTH SENSING ARRAY USING COLOR IMAGE DATA

CROSS-REFERENCE TO RELATED APPLICATION

This application claims the benefit of U.S. Provisional Patent Application 62/731,914, filed Sep. 16, 2018, which is incorporated herein by reference.

FIELD OF THE INVENTION

The present invention relates generally to systems and methods for depth mapping, and particularly to sensor arrays used in time-of-flight sensing.

BACKGROUND

Existing and emerging consumer applications have created an increasing need for real-time three-dimensional (3D) imagers. These imaging devices, also known as depth sensors or depth mappers, enable the remote measurement of distance (and often intensity) to each point in a target scene—referred to as target scene depth—by illuminating the target scene with an optical beam and analyzing the reflected optical signal. Some systems capture a color image of the target scene, as well, and register the depth map with the color image.

A commonly-used technique to determine the distance to each point on the target scene involves transmitting one or more pulsed optical beams towards the target scene, followed by the measurement of the round-trip time, i.e. time-of-flight (ToF), taken by the optical beams as they travel from the source to the target scene and back to a detector array adjacent to the source.

Some ToF systems use single-photon avalanche diodes (SPADs), also known as Geiger-mode avalanche photodiodes (GAPDs), in measuring photon arrival time, or possibly an array of SPAD sensing elements. In some systems, a bias control circuit sets the bias voltage in different SPADs in the array to different, respective values.

This sort of variable biasing capability can be used in selectively actuating individual sensing elements or groups of sensing elements in a SPAD array. (Each sensing element in such an array is also referred to as a "pixel.") A laser light source emits at least one beam of light pulses, and a beam steering device transmits and scans the at least one beam across a target scene. Light collection optics image the target scene scanned by the transmitted beam onto the array. Circuitry is coupled to actuate the sensing elements only in a selected region of the array and to sweep the selected region over the array in synchronization with scanning of the at least one beam.

SUMMARY

Embodiments of the present invention that are described hereinbelow provide improved depth mapping systems and methods for operating such systems.

There is therefore provided, in accordance with an embodiment of the invention, imaging apparatus, including a radiation source, which is configured to emit a first plurality of pulsed beams of optical radiation toward a target scene. An array of a second plurality of sensing elements is configured to output signals indicative of respective times of incidence of photons on the sensing elements, wherein the second plurality exceeds the first plurality. Objective optics are configured to form a first image of the target scene on the array of sensing elements. An image sensor is configured to capture a second image of the target scene in registration with the first image. Processing and control circuitry is coupled to receive the signals from the array and is configured to identify, responsively to the signals, areas of the array on which the pulses of optical radiation reflected from corresponding regions of the target scene are incident, and to process the signals from the sensing elements in the identified areas in order measure depth coordinates of the corresponding regions of the target scene based on the times of incidence, while identifying, responsively to the second image, one or more of the regions of the target scene as no-depth regions.

In some embodiments, the second image is a color image. In a disclosed embodiment, the processing and control circuitry is configured to identify the no-depth regions responsively to respective colors of corresponding parts of the color image. For example, the processing and control circuitry can be configured to identify a blue part of the color image as sky, and to mark the sky as a no-depth region.

Alternatively, the second image is depth map.

In some embodiments, the processing and control circuitry is configured to identify a part of the second image having a luminance that is below a predefined level as a no-depth region.

Additionally or alternatively, the processing and control circuitry is configured to identify the no-depth regions by applying a deep learning network to the second image, so as to compute respective probabilities of pixels of the second image being in the no-depth region. In a disclosed embodiment, the deep learning network is configured to operate on both the second image and the depth coordinates.

In some embodiments, the processing and control circuitry is configured, when the signals output from one or more of the identified areas of the array are below a minimum threshold, while the regions of the target scene corresponding to the one or more of the identified areas are not identified as no-depth regions, to recalibrate the array so as to select one or more new areas of the array from which to receive the signals for processing. In a disclosed embodiment, the processing and control circuitry is configured to select the one or more new areas of the array by searching over the sensing elements so as to find the areas on which the light pulses reflected from the target scene are imaged by the objective optics.

In some embodiments, the sensing elements include single-photon avalanche diodes (SPADs). Additionally or alternatively the processing and control circuitry is configured to group the sensing elements in each of the identified areas together to define super-pixels, and to process together the signals from the sensing elements in each of the super-pixels in order to measure the depth coordinates.

There is also provided, in accordance with an embodiment of the invention, a method for imaging, which includes directing a first plurality of pulsed beams of optical radiation toward a target scene. A first image of the target scene is formed on an array of a second plurality of sensing elements, which output signals indicative of respective times of incidence of photons on the sensing elements, wherein the second plurality exceeds the first plurality. The array is calibrated so as to identifying areas of the array on which the pulses of optical radiation reflected from corresponding regions of the target scene are incident. The signals from the sensing elements in the identified areas are processed in order measure depth coordinates of the corresponding regions of the target scene based on the times of incidence.

A second image of the target scene is captured in registration with the first image. Upon a failure to receive usable signals from one or more of the identified areas of the array with respect to the corresponding regions of the scene, the second image is checked in order to determine whether to identify the corresponding regions as no-depth regions. When the regions of the target scene corresponding to the one or more of the identified areas are not identified as no-depth regions, the array is recalibrated so as to select one or more new areas of the array from which to receive the signals for processing.

The present invention will be more fully understood from the following detailed description of the embodiments thereof, taken together with the drawings in which:

DETAILED DESCRIPTION OF EMBODIMENTS

Overview

Figure 1:
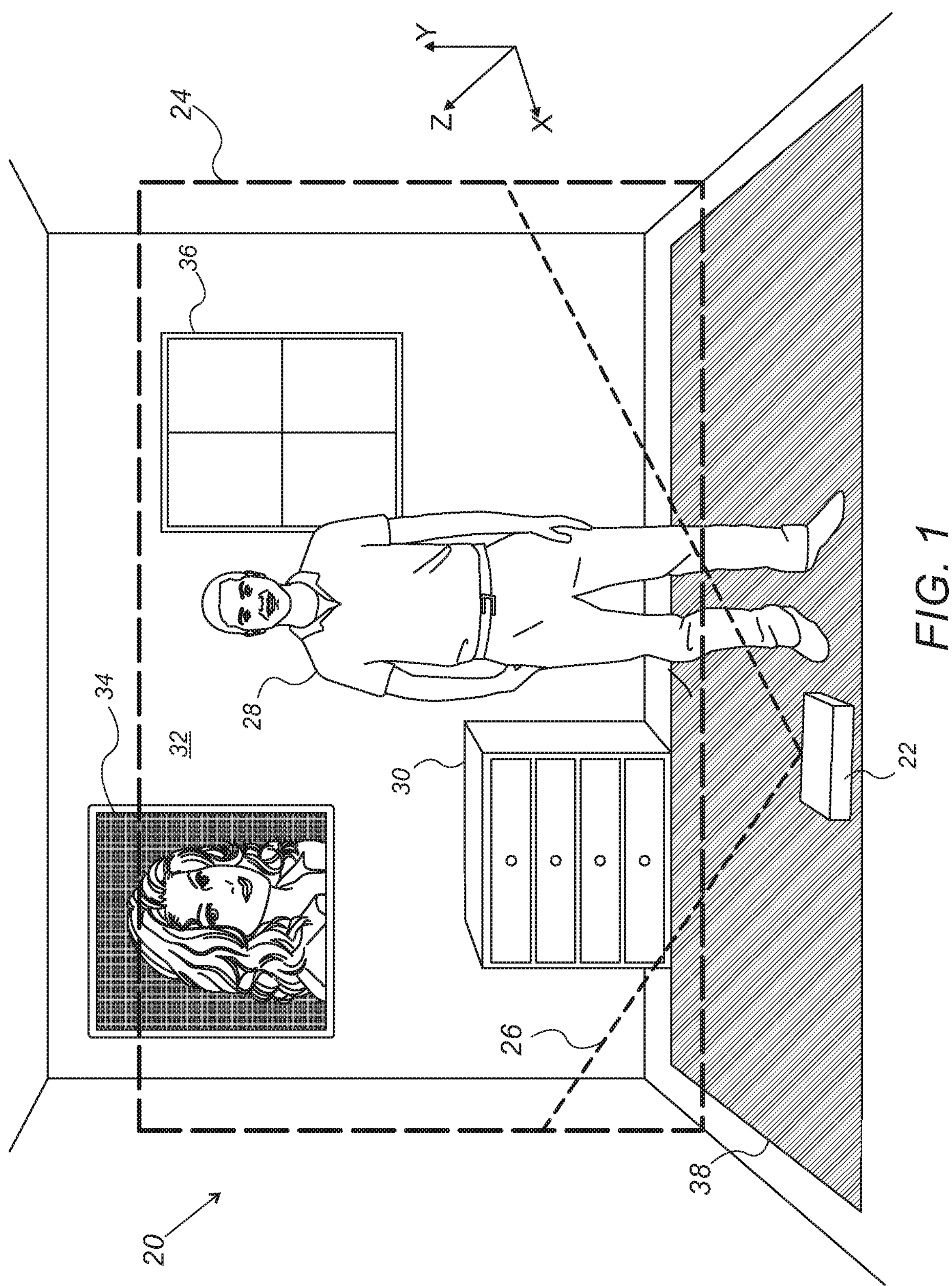
FIG. 1 is a schematic, pictorial illustration of a depth mapping system, in accordance with an embodiment of the invention.

In some embodiments of the present invention, SPADs are grouped together into "super-pixels," meaning groups of mutually-adjacent pixels along with data processing elements that are coupled directly to these pixels. At any time during operation of the system, only the sensing elements in the area or areas of the array that are to receive reflected illumination from a beam are actuated, for example by appropriate biasing of the SPADs in selected super-pixels, while the remaining sensing elements are inactive. The sensing elements are thus actuated only when their signals provide useful information. This approach reduces the background signal, thus enhancing the signal-to-background ratio, and lowers both the electrical power needs of the detector array and the number of data processing units that must be attached to the SPAD array.

One issue to be resolved in a depth mapping system of this sort is the sizes and locations of the super-pixels to be used. For accurate depth mapping, with high signal/background ratio, it is important that the super-pixels contain the detector elements onto which most of the energy of the reflected beams is imaged, while the sensing elements that do not receive reflected beams remain inactive. Even when a static array of emitters is used, however, the locations of the reflected beams on the detector array can change, for example due to thermal and mechanical changes over time, as well as optical effects, such as parallax.

In response to this problem, the locations of the laser spots on the SPAD array may be calibrated. For this purpose, processing and control circuitry receives timing signals from the array and searches over the sensing elements in order to identify the respective regions of the array on which the light pulses reflected from the target scene are incident. Knowledge of the depth mapping system may be used in order to pre-compute likely regions of the reflected laser spots to be imaged onto the SPAD array, and to focus the search in these areas. Alternatively or additionally, a small subset of the locations of laser spots can be identified in an initialization stage, and then used in subsequent iterative stages to predict and verify the positions of further laser spots until a sufficient number of laser spots have been located.

Even following meticulous calibration, however, it can occur in operation of the depth mapping system that some of the pixels or super-pixels on which laser spots are expected to be imaged fail to output usable timing signals. This sort of situation can arise when the number of reflected photons captured by these pixels or super-pixels due to a sequence of laser pulses is below some minimum threshold. The failure in such a case may be due to a change in the locations of the reflected laser spots on the SPAD array, due to thermal, mechanical or optical effects, as noted above. In such cases, recalibration of the super-pixel positions may be required in order to account for the new spot locations.

On the other hand, the failure to receive usable signals in a certain area of the SPAD array may simply be because the region of the target scene that is imaged onto this area of the array strongly absorbs the laser radiation or is very distant from the depth mapping system. Such areas of the array are referred to herein as "no-depth" areas, since the depth mapping system is incapable of extracting meaningful depth values for the corresponding regions of the target scene. These corresponding regions of the target scene are referred to, in the present description and in the claims, as "no-depth regions," even if they are located at a finite distance from the array. In such circumstances, recalibration will simply waste the resources of the depth mapping system, without leading to any improvement in the mapping results. It is difficult to ascertain based on the depth map alone, however, whether the failure of a given super-pixel to output a usable signal is due to its being in a no-depth area or is actually indicative of a need for recalibration.

Embodiments of the present invention that are described herein address this problem by enabling the depth mapping system to identify no-depth areas using ancillary image data, before undertaking recalibration. In the disclosed embodiments, this ancillary image data is provided by a color image sensor, which captures two-dimensional (2D) images in registration with the SPAD array. Alternatively or additionally, other sources of ancillary image data may be used for this purpose, such as monochrome image sensors or depth maps provides by other depth sensors, if available.

Thus, in the disclosed embodiments, imaging apparatus comprises both a depth sensing assembly, for generating a depth map of a target scene, and an image sensor, which provides the ancillary image data. The depth sensing assembly comprises a radiation source, which emits multiple pulsed beams of optical radiation toward the target scene, and an array of sensing elements, such as SPADs, for example, which output signals indicative of the times of incidence of photons on the sensing elements. Objective optics form an image of the target scene on the array of sensing elements, while the image sensor captures its own image of the target scene in registration with the image formed on the array.

Processing and control circuitry processes the signals output by the sensing elements in order measure depth coordinates of corresponding regions of the target scene, based on the times of incidence of the photons. In the disclosed embodiments, the number of sensing elements in the array is greater than the number of beams emitted by the radiation source. Therefore, the processing and control circuitry searches over the sensing elements in order to identify, based on the signals that they output, the areas of the array on which the light pulses reflected from corresponding regions of the target scene are incident, and uses the signals only from these areas in measuring the depth coordinates. The processing and control circuitry may group the sensing elements in each of the identified areas together to define super-pixels, and process together the signals from the sensing elements in each of the super-pixels in order to measure the depth coordinates. The search for the areas of the array on which the reflected light pulses are incident may be carried out, for example, using a random or focused search, or using any other suitable search algorithm.

The processing and control circuitry can use the ancillary image data in identifying certain regions of the target scene as no-depth regions and identifying other regions of the target scene as regions where depth data is expected. Such no-depth regions typically correspond to areas of the array of sensing elements (among the areas that were identified in the search described above) in which the signals output from the sensing elements were found to be below a certain minimum threshold. In other words, the processing and control circuitry uses the 2D image of these regions that is captured by the image sensor in evaluating optical properties of these regions and thus concluding that they are not expected to return usable reflected beams. On the other hand, when the regions of the target scene corresponding to one or more of these areas of the array are not identified as no-depth regions in the 2D image captured by the image sensor, the processing and control circuitry may conclude that recalibration is needed in order to select one or more new areas of the array from which to receive the signals for processing.

In some embodiments, the 2D image captured by the image sensor is a color image, and the processing and control circuitry can identify certain types of no-depth regions based on the respective colors of corresponding parts of the color image. For example, the processing and control circuitry may identify a blue part of the color image as sky (particularly when the blue color appears in the upper part of the image), and will thus mark this part of the image as a no-depth region. Additionally or alternatively, the processing and control circuitry may use luminance information from the 2D image in identifying no-depth regions, such that parts of the image having a luminance that is below a predefined level may be marked as no-depth regions.

Further additionally or alternatively, other criteria may be applied in identifying no-depth regions and thus deciding whether recalibration is or is not required. For example, the location of certain regions in the image can be a factor in identifying them as no-depth regions. Such no-depth regions include dark floors at the bottom of the image, as well as sky at the top of the image. The inertial sensor in the imaging apparatus can be used in verifying which part of the image is the top and which is the bottom. Time of day and geolocation can also be used as indicators of outdoor sky color.

Although the above description refers to specific decision criteria for identifying no-depth regions, the entire decision process can be accomplished by training a deep neural network to predict the no-depth area. Such a network may use the color image, the luminance image or a combination of these images, possibly together with other depth sensing modalities. In this case, the decision criteria are implicit in the weights of the neural network.

System Description

FIG. 1 is a schematic, pictorial illustration of a depth mapping system 20, in accordance with an embodiment of the invention. In the pictured scenario, an imaging device 22 generates a depth map of a target scene 24 within a field of view 26 of the device. In this example, target scene 24 contains foreground objects, such as human FIG. 28 and furniture 30, as well as background objects, including a wall 32, picture 34, window 36 and rug 38. The front plane of device 22 is taken, for the sake of convenience, to be the X-Y plane, and depth coordinates of points in the target scene are measured along the Z-axis. The depth map generated by imaging device 22 thus represents target scene 24 as a grid of points in the X-Y plane with a depth coordinate indicating the distance measured to each point.

For some of the points in the depth map, however, imaging device 22 may be unable to resolve the depth coordinate. Imaging device measures depth values by directing beams of optical radiation toward points in target scene 24 and measuring times of arrival of photons reflected from each point. Picture 34 and rug 38, for example, may contain dark areas that absorb radiation, so that the flux of reflected photons from these areas may be too weak for imaging device 22 to sense reliably. As another example, assuming window 36 itself does not reflect strongly (or that the window is open or absent), the times of flight of photons to and from objects outside the window back to imaging device 22 may be longer than the time window used by the imaging device, and the flux of reflected photons may be too weak to sense. Such regions of target scene 24 will therefore appear in the depth map as "no-depth" areas, meaning that no depth coordinates could be found for the points in these regions.

Figure 2:
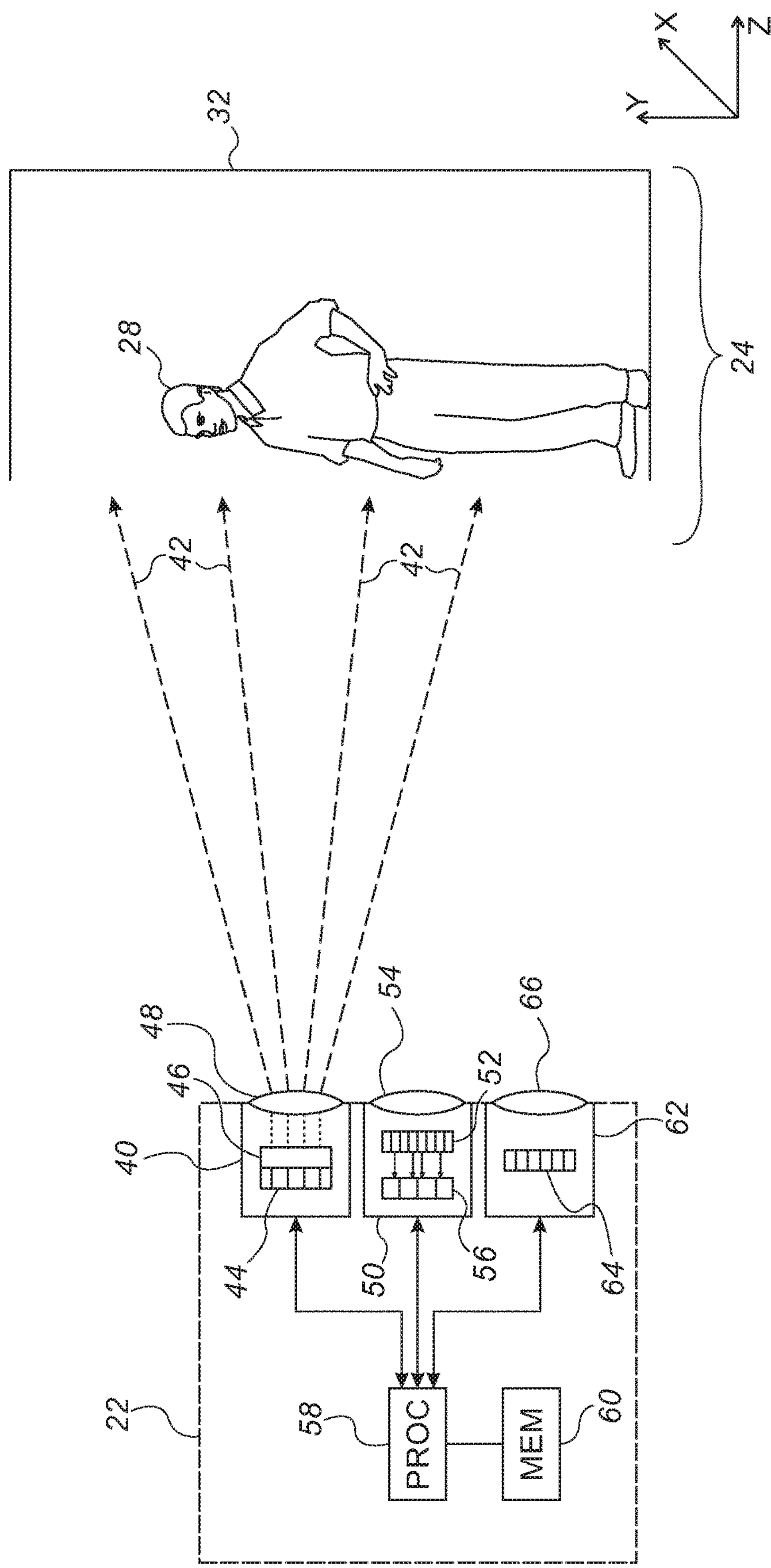
FIG. 2 is a schematic side view of the depth mapping system of FIG. 1, in accordance with an embodiment of the invention.

FIG. 2 is a schematic side view of system 20, showing details of imaging device 22, in accordance with an embodiment of the invention. These details are shown by way of example, for the sake of concreteness and clarity, to aid in understanding the operating principles of the present invention in generating depth maps and, in particular, handling "no-depth" regions in such depth maps. Alternatively, these principles may be applied in other sorts of systems with suitable depth mapping and imaging capabilities.

Imaging device 22 comprises a radiation source 40, which emits multiple pulsed beams 42 of optical radiation toward target scene 24. The term "optical radiation" is used in the present description and in the claims to refer to electromagnetic radiation in any of the visible, infrared and ultraviolet ranges, and may be used interchangeably with the term "light" in this context. In the present example, radiation source 40 comprises a two-dimensional array 44 of vertical-cavity surface-emitting lasers (VCSELs), which are driven to emit sequences of short pulses of optical radiation. Optionally, a diffractive optical element (DOE) 46 can be used to replicate the actual beams emitted by the VCSELs in array 44 so as to output a larger number of beams 42 (for example, on the order of 500 beams) at different, respective angles from radiation source 40. The VCSELs are typically driven to emit their respective beams simultaneously, although alternatively, the VCSELs may be actuated individually or in smaller groups. Further alternatively, radiation source 40 may comprise a scanned beam source. A collimating lens 48 (which may be positioned either between array 44 and DOE 46 or following DOE 46 as shown in FIG. 2) projects beams 42 toward target scene 24.

A receiver 50 (also referred to as a "depth camera") in imaging device 22 comprises a two-dimensional array 52 of sensing elements, such as SPADs, which output signals indicative of respective times of incidence of photons on the sensing elements. Objective optics 54 form an image of target scene 24 on array 52. Processing units 56 are coupled to groups of mutually-adjacent sensing elements, which are referred to herein as "super-pixels," and process together the signals from the sensing elements in each of the super-pixels in order to generate a measure of the times of arrival of photons on the sensing elements in the group following each pulse of beams 42. For clarity of explanation, processing units 56 are shown in FIG. 2 as separate from array 52, but in some implementations the processing units and array are integrated in a single integrated circuit device.

Processing units 56 comprise hardware amplification and logic circuits, which sense and record pulses output by the SPADs (or other sensing elements) in respective super-pixels. Processing units 56 thus measure the times of arrival of the photons that gave rise to the pulses output by the SPADs, and possibly the strengths of the reflected laser pulses impinging on array 52. Processing units 56 may comprise time-to-digital converters (TDCs), for example, along with digital circuitry for assembling histograms of the times of arrival of photons incident on the respective super-pixels over multiple pulses emitted by the VCSELs in array 44. Processing units 56 thus output values that are indicative of the distance to respective points in scene 24, and may also output an indication of the signal strength. Alternatively or additionally, some or all of the components of processing units 56 may be separate from array 52 and may, for example, be integrated with a control processor 58. For the sake of generality, control processor 58 and processing units 56 are collectively referred to herein as "processing and control circuitry."

Control processor 58 drives array 44 to emit pulses, receives time-of-arrival data from processing units 56, and provides control signals to the processing units in order to select the sensing elements in array 52 that are to be assigned to the respective super-pixel to which the processing unit is coupled. For example, each processing unit 56 may be coupled to a super-pixel comprising four SPAD pixels, i.e., a group of four mutually-adjacent elements of array 52. Typically, the number of sensing elements in array 52 is much larger than the number of beams 42 emitted from radiation source 40, while the number of processing units 56 is roughly equal to the number of beams.

To make optimal use of the available sensing and processing resources, control processor 58 identifies the respective areas of the array on which the pulses of optical radiation reflected from corresponding regions of target scene 24 are imaged by objective optics 48, and chooses the super-pixels to correspond to these areas. The signals output by sensing elements outside these areas are not used, and these sensing elements may thus be deactivated, for example by reducing or turning off the bias voltage to these sensing elements. Methods for choosing the super-pixels initially, for example using various search strategies, were described above. Further methods for verifying and updating the selection of super-pixels are described hereinbelow.

Control processor 58 calculates the times of flight of the photons in each of beams 42, and thus maps the distance to the corresponding points in target scene 24. This mapping is based on the timing of the emission of beams 42 by radiation source 40 and from the times of arrival (i.e., times of incidence of reflected photons) measured by the processing units 56. Control processor 58 stores the depth coordinates in a memory 60, and may output the corresponding depth map for display and/or further processing. When the signals output from one or more of the super-pixels in the array are below a certain minimum threshold, however, control processor 58 will not generate depth coordinates for the points in these areas.

In addition to the depth sensing functionalities described above, imaging device 22 comprises a two-dimensional imaging camera 62. Camera 62 comprises an image sensor 64, such as an RGB color sensor, as is known in the art. An imaging lens 66 forms an image of target scene 24 on image sensor 64, which thus outputs an electronic image of the target scene. Because camera 62 is mounted in a fixed spatial and optical relation to receiver 50, the electronic image output by camera 62 will be registered with the image that is formed by objective optics 54 on array 52 (although adjustment of the registration may be needed to compensate for parallax if the baseline distance between receiver 50 and camera 62 is significant relative to the depth of the target scene). Control processor 58 receives and uses the image data output by camera 62 in identifying and handling no-depth regions in the depth map, as described further hereinbelow.

Control processor 58 typically comprises a programmable processor, which is programmed in software and/or firmware to carry out the functions that are described herein. Alternatively or additionally, controller 26 comprises hard-wired and/or programmable hardware logic circuits, which carry out at least some of the functions of the control processor. Although control processor 58 is shown in FIG. 2, for the sake of simplicity, as a single, monolithic functional block, in practice the control processor may comprise a single chip or a set of two or more chips, with suitable interfaces for receiving and outputting the signals that are illustrated in the figure and are described in the text.

Methods of Operation

Figures 3A, 3B, 3C:
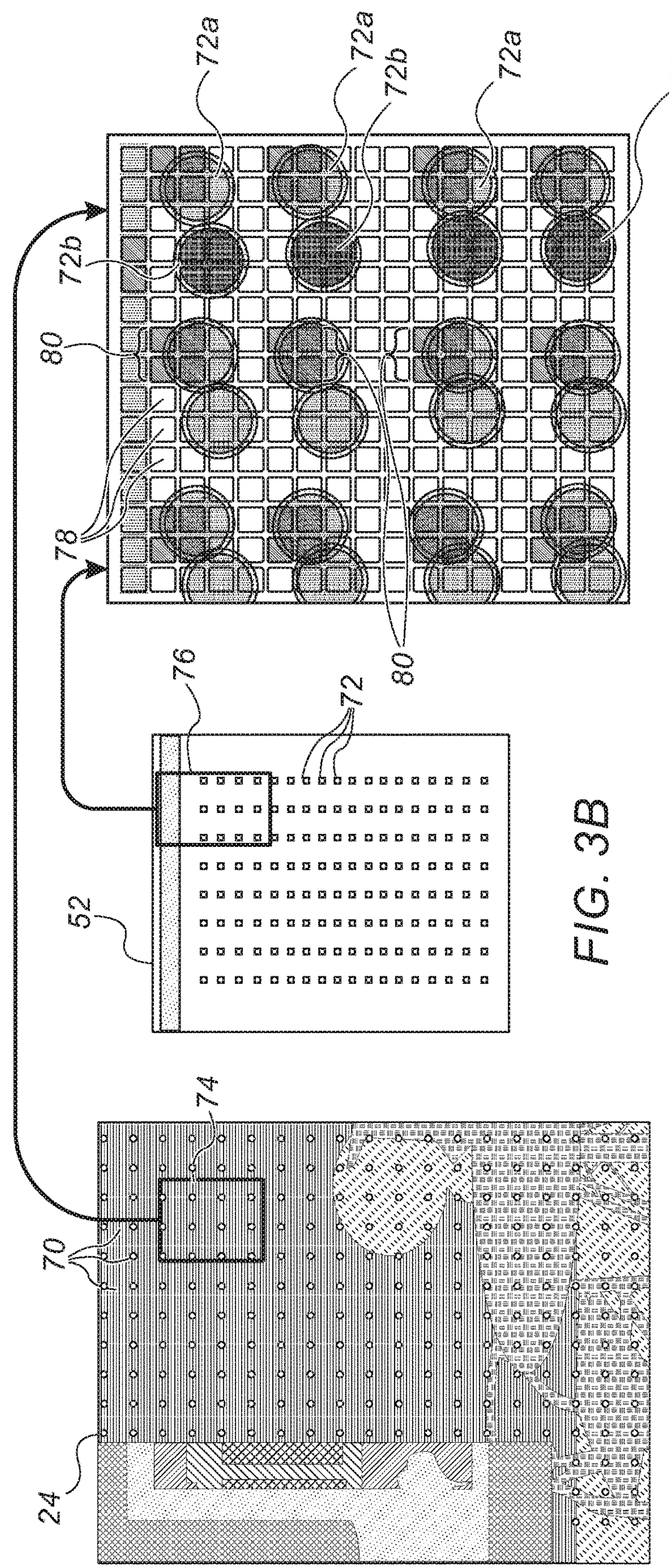
FIG. 3A is a schematic representation of a pattern of spots projected onto a target scene, in accordance with an embodiment of the invention.
FIG. 3B is a schematic frontal view of a ToF sensing array, in accordance with an embodiment of the invention.
FIG. 3C is a schematic detail view of a part of the ToF sensing array of FIG. 3B, onto which images of the spots in a region of the target scene of FIG. 3A are cast, in accordance with an embodiment of the invention.

FIG. 3A is a schematic representation of a pattern of spots 70 of optical radiation that are projected onto target scene 24, in accordance with an embodiment of the invention. Each spot 70 is cast by a corresponding beam 42 (FIG. 2).

FIG. 3B is a schematic frontal view of array 52 onto which target scene 24 is imaged, in accordance with an embodiment of the invention. The sensing elements, such as SPADs, in array 52 are too small to be seen in this figure. Rather, FIG. 3B shows the locations of spots 72 that are reflected from target scene 24 and imaged onto array 52 by objective optics 54. In other words, each spot 72 is the image on array 52 of a corresponding spot 70 that is projected onto scene 24 by radiation source 40. Objective optics 54 image a region 74 of target scene 24 (FIG. 3A), including spots 70 that the area contains, onto a corresponding area 76 on array 52.

FIG. 3C is a schematic detail view of area 76 of array 52, showing the locations of spots 72 that are imaged onto the array, in accordance with an embodiment of the invention. In this view, it can be seen that array 52 comprises a matrix of sensing elements 78, such as SPADs. Control processor 58 assigns each processing unit 56 to a super-pixel 80 comprising a 2×2 group of the sensing elements 78. In this example, it is assumed that during an initial calibration stage, spots 72 were imaged onto array 52 at locations 72*a*. Control processor 58 thus selected the sensing elements 78 to assign to each super-pixel 80 so as to maximize the overlap between the corresponding spot 72 and the super-pixel, and thus maximize the signal received from each super-pixel.

At some later stage, however, spots 72 shifted to new locations 72*b* on array 52. This shift may have occurred, for example, due to mechanical shock or thermal effects in imaging device 22, or due to other causes. Spots 72 at locations 72*b* no longer overlap with super-pixels 80 in area 76, or overlap only minimally with the super-pixels. Sensing elements 78 on which the spots are now imaged, however, are inactive and are not connected to any of processing units 56. Therefore, control processor 58 no longer receives usable signals from super-pixels 80 in area 76, or at best receives only weak signals, resulting in noisy and unreliable depth measurements.

In this situation, control processor 58 is unable to find locations 72*b* without recalibrating the assignment of sensing elements 78 to super-pixels 80. Furthermore, based on the output of receiver 50 alone, control processor 58 is unable to ascertain whether the failure to receive usable signals is due to a need for calibration or merely to the fact that spots 70 in region 74 are reflected so weakly that too few reflected photons are incident at locations 72*a*. This latter situation is exemplified in FIGS. 4A/B.

Figure 4B:
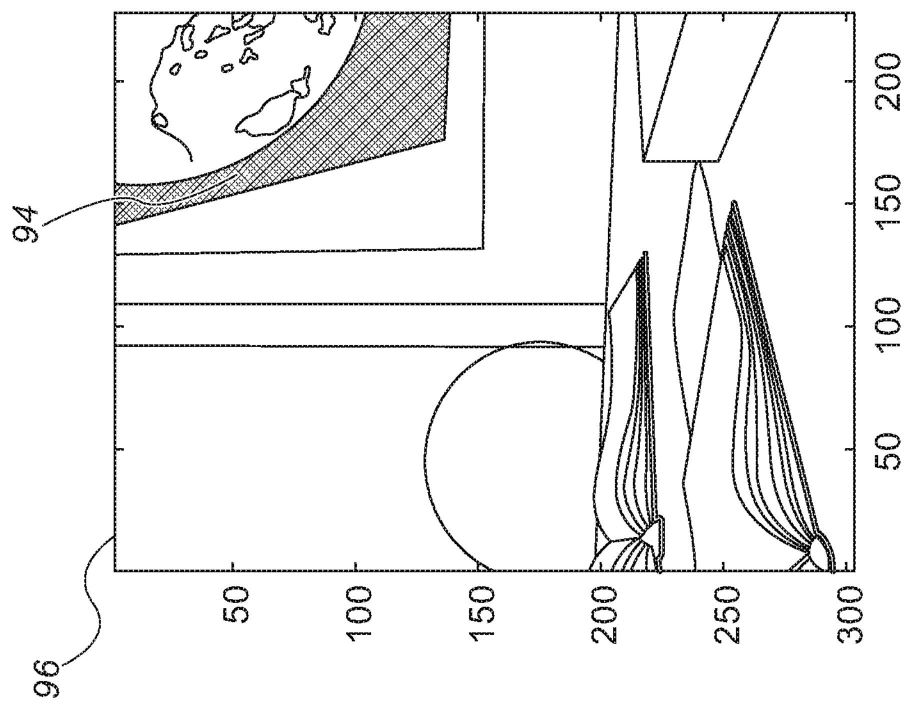
FIGS. 4A and 4B are schematic representations of images of a target scene that are captured by a ToF sensing array and a color image sensor, respectively.
Figure 4A:
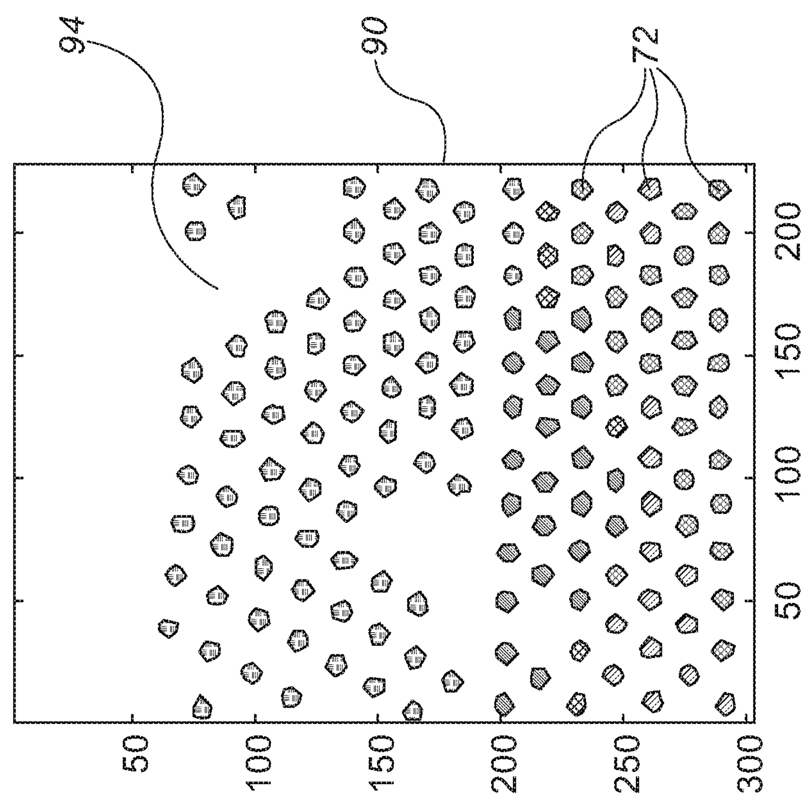

FIGS. 4A and 4B are schematic representations of images 90 and 96 of target scene 24, which are captured, respectively, by array 52 and image sensor 64, in accordance with an embodiment of the invention. (In this example, successive rows of beams 42, and hence of reflected spots 72 on array 52, are offset from one another; but otherwise the configuration of system 20 is similar to that shown in the preceding figures.)

A dark region 94 in target scene 24—in this case due to a dark part of a picture in the background of the scene—gives rise to a corresponding no-depth area in image 90, in which spots 72 are too weak to give usable signals. In this case, recalibration of the assignment of sensing elements 78 to super-pixels 80 is unlikely to improve the results in any way. Control processor 58 is able to use ancillary image data from the image output by camera 62 in order to ascertain that region 94 is dark, and thus avoid such unnecessary recalibration.

Figure 5:
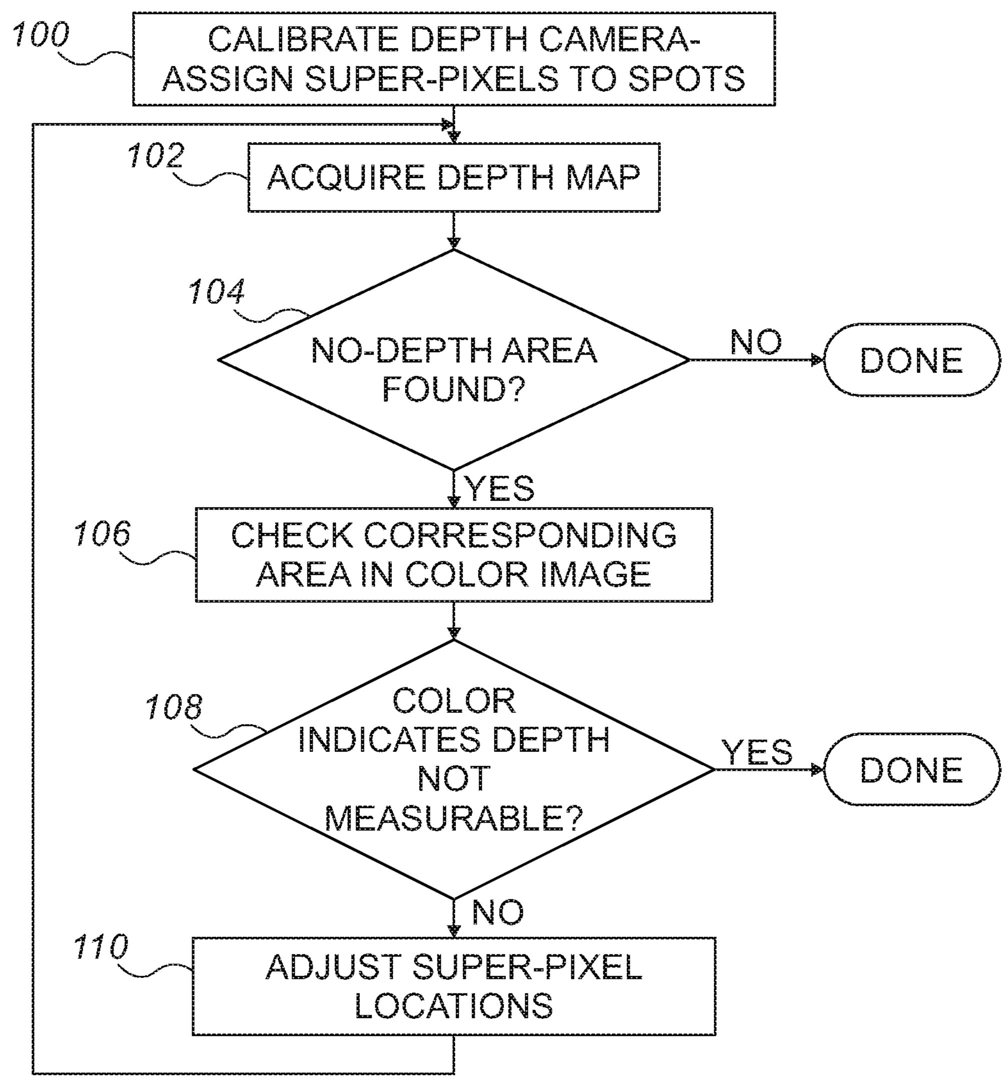
FIG. 5 is a flow chart that schematically illustrates a method for calibrating a depth mapping system, in accordance with an embodiment of the invention.

FIG. 5 is a flow chart that schematically illustrates a method for calibrating depth mapping system 20, in accordance with an embodiment of the invention. The purpose of this calibration, as explained earlier, is to find and maintain the optimal assignment of sensing elements 78 to super-pixels 80 (FIG. 3C), meaning generally that the overlap between super-pixels 80 and respective spots 72 is maximized.

In an initial calibration step 100, control processor 58 calibrates receiver 50 (also referred to as the "depth camera," as noted above). Calibration procedures that may be used in this step were described above. Typically, in this step, control processor 58 makes an initial assignment of processing units 56 to groups of sensing elements 78, and then drives radiation source to output a sequence of pulses in beam 42. Control processor 58 assesses the results this pulse sequence, for example by checking, for each processing unit 56, the number of photons received as a fraction of the number of pulses that were fired. This process is repeated while connecting processing units 56 to multiple different groups of sensing elements 78, until an optimal assignment of processing units 56 to sensing elements is found. An optimal assignment will maximize the overlap between spots 72 on array 52 and corresponding super-pixels 80, as illustrated in FIG. 3C.

Based on the calibrated assignment, imaging device 22 acquires a depth map, at a map acquisition step 102. To acquire such a depth map, radiation source 40 fires a sequence of pulses in beams 42, and receiver 50 measures the times of incidence of photons on super-pixels 80 following each pulse. Processing units 56 can output respective histograms of the times of arrival of the photons, relative to the times of transmission of the pulses. Control processor 58 extracts a time-of-flight value from the histogram of each super-pixel 80, and thus constructs the depth map of target scene 24.

Control processor 58 checks the outputs of processing units 56 to determine whether there are any no-depth areas in the depth map, i.e., areas in which the depth coordinates are undefined, at a no-depth checking step 104. A no-depth region in target scene 24 may be defined by a corresponding area of array 52 in which multiple super-pixels 80 failed to output usable histograms and thus could not provide meaningful depth data, for example, because the number of photons received as a fraction of the number of pulses that were fired was below some minimal threshold. The parameters according to which control processor 58 identifies a certain area as a no-depth area, such as the minimal threshold fraction of photons received relative to pulses fired that is used to define a "no-depth" super-pixel, and the number of adjacent "no-depth" super-pixels needed to identify a no-depth area in the depth map, can be set by an operator of system 20 in accordance with application requirements. If the depth map contains no such no-depth areas, the process terminates.

When control processor 58 identifies a no-depth area in the depth map at step 104, it proceeds to check the corresponding area in a two-dimension color image of target scene 24 that was output by camera 62, at a color evaluation step 106. A number of tests can be applied at this stage in order to identify regions of the target scene as no-depth regions on the basis of this image, for example:

- If the luminance of the corresponding area in the two-dimension image is below a predefined level. This situation is exemplified by region 94 in FIGS. 4A/B, as well as by the dark regions of picture 34 and rug 38 in FIG. 1. The term "luminance," in the context of the present description and in the claims, refers to a measure of the intensity of the optical radiation captured by camera 62 from each point in target scene 24. Assuming image sensor 64 to be an RGB color sensor, for example, the luminance can be computed as a weighted sum of the red, green and blue pixel values, as is known in the art. Alternatively, other measures of luminance may be used at this step.
- If the color falls within a range that is associated with no-depth regions. For example, a certain range of blue hues can be associated with the sky, as might be seen through window 36 (FIG. 1). The sky will give no usable depth values because of its large distance from device 22. In such cases, control processor 58 may apply other image-related factors, such as the location of the blue region within the image (typically in the upper part) and the shape of the blue region, in identifying regions of sky.
- Combinations of color and luminance information may also be used in identifying specific sorts of no-depth regions. For example, dark areas of the floor may be identified as carpets, from which depth data cannot be retrieved. Rectangular gray areas may be identified as computer screens, which likewise do not provide usable depth data.

In an alternative embodiment, a deep learning network can be applied to the color image in order to identify no-depth regions. The network is trained on RGB images and corresponding, accurate ground-truth depth data, and thus learns to predict the appearance of a no-depth regions within the image. Following this training, for each pixel in an image the network outputs a measure corresponding to the probability of the pixel being in a no-depth region. From these probability measures, control processor 58 computes the likelihood of entire regions in the image being no-depth regions. If this likelihood is greater than a certain threshold, the region is classified as a no-depth region. Alternatively the network may be trained to predict the no-depth probabilities using a low-resolution version of the original depth map. Further additionally or alternatively, the network may operate on the color and depth images, and produce a measure of the probability of each pixel being in a no depth region. Additionally or alternatively, machine learning techniques can be used to classify objects in target scene 24, and this classification can be used in identifying no-depth regions.

In a further embodiment, when another depth mapping modality, such as pattern-based or stereoscopic depth mapping, is available to imaging device 22, it can be used to predict no-depth regions. This alternative is of particular benefit when the other modality is not subject to parallax, and thus provides an independent depth estimate.

Control processor 58 checks whether all of the no-depth areas found in step 104 were classified as no-depth regions of target scene 24 in step 106, at a color checking step 108. This step may be based on the tests described above and/or on the output of a deep learning network, also described above. If all no-depth areas were indeed classified as no-depth regions, the process terminates. If not, control processor 58 may conclude that the positions of super-pixels 80 within the corresponding no-depth area of array 52 should be shifted. In this case, control processor 58 recalibrates the assignment of processing units 56 to sensing elements 78, at a recalibration step 110. This recalibration may extend only over the no-depth area of array 52, or alternatively, over larger areas of the array or even the entire array. The recalibration can use the same search strategy as was used at step 100, or any other suitable strategy for this purpose. Control then returns to step 102 for acquisition of the next depth map.

In another embodiment of the present invention, the identification of no-depth regions can be used in enhancing the subsequent sensitivity and accuracy of depth measurements made by receiver 50. Specifically, control processor 58 can process the histograms output by receiver 50 in such no-depth regions in order to estimate slowly-varying artifacts in the depth measurements, due to factors such as nonlinearities of the sensor circuitry, reflections of the transmitted beams within device 22, timing variations, etc. Control processor 58 can then apply these estimates in enhancing the sensitivity and performance of device 22.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An imaging apparatus, comprising:

a radiation source, which is configured to emit a first number, greater than one, of pulsed beams of optical radiation toward a target scene;

an array of a second number of sensing elements, configured to output signals indicative of respective times of incidence of photons on the sensing elements, wherein the second number exceeds the first number;

objective optics configured to form a first image of the target scene on the array of sensing elements;

an image sensor, which is configured to capture a second image of the target scene in registration with the first image; and processing and control circuitry, which is coupled to receive the signals from the array and is configured to identify, responsively to the signals, areas of the array on which pulses of optical radiation reflected from corresponding regions of the target scene are incident, and to process the signals from the sensing elements in the identified areas in order to measure depth coordinates of the corresponding regions of the target scene based on the times of incidence, while identifying, in response to the second image, one or more of the regions of the target scene as no-depth regions, wherein the processing and control circuitry is configured, when the signals output from one or more of the identified areas of the array are below a minimum threshold, while the regions of the target scene corresponding to the one or more of the identified areas are not identified as no-depth regions, to recalibrate the array so as to select one or more new areas of the array from which to receive the signals for processing.

2. The imaging apparatus according to claim 1, wherein the second image is a color image.

3. The imaging apparatus according to claim 2, wherein the processing and control circuitry is configured to identify the no-depth regions in response to respective colors of corresponding parts of the color image.

4. The imaging apparatus according to claim 3, wherein the processing and control circuitry is configured to identify a blue part of the color image as sky, and to mark the sky as a no-depth region.

5. The imaging apparatus according to claim 1, wherein the second image is depth map.

6. The imaging apparatus according to claim 1, wherein the processing and control circuitry is configured to identify a part of the second image having a luminance that is below a predefined level as a no-depth region.

7. The imaging apparatus according to claim 1, wherein the processing and control circuitry is configured to identify the no-depth regions by applying a deep learning network to the second image, so as to compute respective probabilities of pixels of the second image being in the no-depth region.

8. The imaging apparatus according to claim 7, wherein the deep learning network is configured to operate on both the second image and the depth coordinates.

9. The imaging apparatus according to claim 1, wherein the processing and control circuitry is configured to select the one or more new areas of the array by searching over the sensing elements so as to find the areas on which the pulses reflected from the target scene are imaged by the objective optics.

10. The imaging apparatus according to claim 1, wherein the sensing elements comprise single-photon avalanche diodes (SPADs).

11. The imaging apparatus according to claim 1, wherein the processing and control circuitry is configured to group the sensing elements in each of the identified areas together to define super-pixels, and to process together the signals from the sensing elements in each of the super-pixels in order to measure the depth coordinates.

12. A method for imaging, comprising:

directing a first number, greater than one, of pulsed beams of optical radiation toward a target scene;

forming a first image of the target scene on an array of a second number of sensing elements, which output signals indicative of respective times of incidence of photons on the sensing elements, wherein the second number exceeds the first number;

calibrating the array so as to identifying areas of the array on which the pulses of optical radiation reflected from corresponding regions of the target scene are incident;

processing the signals from the sensing elements in the identified areas in order measure depth coordinates of the corresponding regions of the target scene based on the times of incidence;

capturing a second image of the target scene in registration with the first image;

upon a failure to receive usable signals from one or more of the identified areas of the array with respect to the corresponding regions of the scene, checking the second image in order to determine whether to identify the corresponding regions as no-depth regions; and when the regions of the target scene corresponding to the one or more of the identified areas are not identified as no-depth regions, recalibrating the array so as to select one or more new areas of the array from which to receive the signals for processing.

13. The method according to claim 12, wherein the second image is a color image.

14. The method according to claim 13, wherein checking the second image comprises identifying the no-depth regions in response to respective colors of corresponding parts of the color image.

15. The method according to claim 12, wherein checking the second image comprises identifying a part of the second image having a luminance that is below a predefined level as a no-depth region.

16. The method according to claim 12, wherein checking the second image comprises applying a deep learning network to the second image, so as to compute respective probabilities of pixels of the second image being in the no-depth region.

17. The method according to claim 12, and comprising, when the signals output from one or more of the identified areas of the array are below a minimum threshold, while the regions of the target scene corresponding to the one or more of the identified areas are not identified as no-depth regions, recalibrating the array so as to select one or more new areas of the array from which to receive the signals for processing.

18. The method according to claim 12, wherein the sensing elements comprise single-photon avalanche diodes (SPADs).

19. The method according to claim 12, wherein processing the signals comprises grouping the sensing elements in each of the identified areas together to define super-pixels, and processing together the signals from the sensing elements in each of the super-pixels in order to measure the depth coordinates.

* * * * *